(12) United States Patent
Miyaji

(10) Patent No.: US 8,508,171 B2
(45) Date of Patent: Aug. 13, 2013

(54) POSITION CONTROL APPARATUS

(75) Inventor: Masashi Miyaji, Aichi (JP)

(73) Assignee: OKUMA Corporation, Niwa-gun (JP)

( * ) Notice: Subject to any disclaimer, the term of this patent is extended or adjusted under 35 U.S.C. 154(b) by 41 days.

(21) Appl. No.: 13/360,130

(22) Filed: Jan. 27, 2012

(65) Prior Publication Data

US 2012/0194121 A1 Aug. 2, 2012

(30) Foreign Application Priority Data

Jan. 28, 2011 (JP) ................................. 2011-016321
Dec. 26, 2011 (JP) ................................. 2011-283744

(51) Int. Cl.
*G05B 11/01* (2006.01)
*G05B 5/01* (2006.01)
*G05B 1/06* (2006.01)
*G05D 23/275* (2006.01)

(52) U.S. Cl.
USPC ............ 318/560; 318/615; 318/632; 318/661

(58) Field of Classification Search
USPC .................. 318/560, 615, 632, 661
See application file for complete search history.

(56) References Cited

U.S. PATENT DOCUMENTS

| 5,243,587 | A | * | 9/1993 | Itoh et al. | 369/47.11 |
| 5,513,114 | A | * | 4/1996 | Matsumoto | 700/193 |
| 6,184,644 | B1 | | 2/2001 | Eguchi | |
| 8,183,927 | B2 | * | 5/2012 | Mochizuki | 330/289 |
| 2003/0020427 | A1 | * | 1/2003 | Hamamura et al. | 318/632 |
| 2003/0030401 | A1 | * | 2/2003 | Fujishima | 318/632 |
| 2007/0194740 | A1 | | 8/2007 | Shibata et al. | |
| 2008/0180052 | A1 | * | 7/2008 | Iwashita et al. | 318/615 |
| 2009/0058346 | A1 | * | 3/2009 | Marushita et al. | 318/611 |
| 2009/0157347 | A1 | * | 6/2009 | Ishii | 702/150 |

FOREIGN PATENT DOCUMENTS

| JP | 3-32550 A | 2/1991 |
| JP | 10-326114 A | 12/1998 |
| JP | 2007-219689 A | 8/2007 |

OTHER PUBLICATIONS

Abstract of JP 10-326114 A, published on Dec. 8, 1998, downloaded from espacenet.com, 1 page.
Abstract of JP 3-032550 A, published on Feb. 13, 1991, downloaded from espacenet.com, 1 page.
Abstract of JP 2007-219689 A, published on Aug. 30, 2007, downloaded from espacenet.com, 1 page.

* cited by examiner

*Primary Examiner* — Eduardo Colon Santana
*Assistant Examiner* — Gabriel Agared
(74) *Attorney, Agent, or Firm* — Osha Liang LLP

(57) ABSTRACT

A position control apparatus calculates a position detection value by adding an output of a first-order delay circuit 17 that receives a difference between a driven member position detection value Pl and a motor position detection value Pm to the motor position detection value Pm, and uses the obtained position detection value as a position feedback value. An aging corrector 30 suppresses low frequency vibrations by controlling a time constant Tp of the first-order delay circuit 17 in such a way as to increase the time constant when a vibratory state of the driven member is detected.

7 Claims, 13 Drawing Sheets

POSITION CONTROL APPARATUS

PRIORITY INFORMATION

This application claims priority to Japanese Patent Application Nos. 2011-016321, filed on Jan. 28, 2011, and 2011-283744, filed on Dec. 26, 2011, which are incorporated herein by reference in their entireties.

BACKGROUND

1. Technical Field

The present invention relates to a position control apparatus for a feed-axis (i.e., a driven member, such as a table, a saddle, or a spindle head) of a machine tool or the like. More specifically, the present invention relates to an improved position control apparatus capable of realizing full-closed control in controlling the position of a driven member based on a position command value.

2. Related Art

The following conventional techniques are available to reduce a position error in a position control apparatus that includes a linear scale attached to a movable portion of a machine tool to detect the position of a driven member and performs full-closed control based on a comparison between a detected driven member position and a position command value.

To reduce the position error in a transient response, it is useful to set the gain of a speed loop and the gain of a position loop to higher values. In this case, the driven member can be accurately controlled in such a way as to reduce adverse influence of an unpredictable load change or disturbance, such as a change in sliding friction of the movable portion or a cutting load.

FIG. 5 is a block diagram illustrating a general full-closed control system. A linear scale 11 generates a position detection value Pl that represents the position of a driven member 12. A subtracter 2 receives the position detection value Pl, as a position feedback value, and calculates a deviation Pdif of the position detection value Pl relative to a position command Pc.

A speed command calculator 3 multiplies the position deviation Pdif by a proportional gain Kp and outputs a multiplication result as a speed command Vc. Meanwhile, a differentiator 14 differentiates a position detection value Pm obtained by a position detector 9 attached to a motor 10. The differentiator 14 outputs a differentiation result as a motor speed detection value Vm. A subtracter 4 obtains a deviation of the motor speed detection value Vm relative to the speed command Vc and outputs the obtained deviation as a speed deviation.

A torque command calculator (i.e., speed loop proportional gain) 5 outputs a speed deviation proportional component based on the speed deviation received from the subtracter 4 and a speed loop proportional gain Pv. A torque command calculator (i.e., speed loop integral gain) 6 outputs a speed deviation integral component based on the speed deviation and a speed loop integral gain Iv. An adder 7 adds the speed deviation proportional component and the speed deviation integral component, and outputs an addition result as a torque command Tc. Further, a portion 8 illustrated in FIG. 5 includes various filters capable of filtering the torque command Tc, and a current control unit.

In the present example, a simplified model is provided based on an assumption that the transfer characteristic of a portion ranging from the speed command Vc to the motor speed detection value Vm is equal to 1. The driven member 12 is connected to the motor via a spring having a spring constant Kb. M represents the weight of the driven member. D represents a viscous friction coefficient of the driven member. In this case, the block diagram illustrated in FIG. 5 can be replaced by a block diagram illustrated in FIG. 6. The transfer function of the entire control system can be expressed using the following formula (1). In formula (1), S represents a Laplacian operator.

$$Pl(S)/Pc(S)=Kp \cdot Kb/(M \cdot S^3 + D \cdot S^2 + Kb \cdot S + Kp \cdot Kb) \quad \text{formula (1)}$$

FIG. 10 is a gain diagram illustrating a characteristic of the entire control system if a condition $Kp<<(Kb/M)^{1/2}$ is applied to the above-described formula.

Recent developments in various filtering techniques or damping controls and introduction of improved speed loops have enabled setting of high values in position/speed loop gain setting. However, the rigidity of a working part of the feed-axis may decrease due to aging (e.g., frictional wear and looseness) of a component that constitutes a driving mechanism, or due to reduction in tensile strength of a ball screw that is derived from expansion of the ball screw, which may occur when the temperature increases during a continuous operation. In this case, the mechanical resonance frequency $(Kb/M)^{1/2}$ decreases. FIG. 11 is a diagram illustrating a gain characteristic of the entire control system defined by formula (1) in the above-described case.

More specifically, a gain margin of the mechanical resonance frequency $(Kb/M)^{1/2}$ decreases due to a highly set position loop gain. In some cases, a driven member may vibrate at low frequencies. Further, in a large-scale machining center, the mechanical resonance frequency $(Kb/M)^{1/2}$ decreases if a workpiece mounted on a driven member is heavier than the expected value. Therefore, low frequency vibrations occur similarly. To solve the above-described problem, the following technique is conventionally available.

FIG. 7 is a control block diagram illustrating another conventional position control apparatus that is directed to suppression of low frequency vibrations. Components similar to those illustrated in FIG. 5 are denoted by the same reference numerals and their descriptions are not repeated. A position detection value calculator 20 illustrated in FIG. 7 outputs a position feedback value Pd, which represents the position defined by the following formula (2) including the driven member position detection value Pl and the motor position detection value Pm. In formula (2), Tp represents a time constant of a first-order delay circuit 17 and S represents a Laplacian operator.

$$Pd=Pm+(Pl-Pm)/(1+Tp \cdot S) \quad \text{formula (2)}$$

In formula (2), $1/(1+Tp \cdot S)$ represents the first-order delay circuit. The first-order delay circuit 17 illustrated in FIG. 7 calculates the second term of formula (2).

A dotted line in FIG. 12 indicates a gain characteristic of the entire control system illustrated in FIG. 7 in a case where a condition $Tp>>(Kb/M)^{1/2}$ is applied to formula (2). The gain margin of the mechanical resonance frequency $(Kb/M)^{1/2}$ becomes larger. Further, a solid line in FIG. 12 indicates a gain characteristic of the entire control system in a case where the rigidity of a working part of the feed-axis decreases. Thus, the conventional position control apparatus illustrated in FIG. 7 is effective in solving the problem of low frequency vibrations described in the conventional example illustrated in FIG. 5.

FIG. 8 is a control block diagram illustrating another position control apparatus that is directed to suppress low frequency vibrations. Components similar to those illustrated in FIG. 5 are denoted by the same reference numerals and their descriptions are not repeated. A speed detection value calculator 25 outputs a speed feedback value Vd, which represents the speed defined by the following formula (3), including a driven member speed detection value Vl (i.e., a value obtained by a differentiator 21 that differentiates the driven member position detection value Pl) and the motor speed detection value Vm. In formula (3), Tv represents a time constant of a first-order delay circuit 23 and S represents a Laplacian operator.

$$Vd=Vm+(Vl-Vm)/(1+Tv \cdot S) \qquad \text{formula (3)}$$

In formula (3), $1/(1+Tv \cdot S)$ represents the first-order delay circuit. The first-order delay circuit 23 illustrated in FIG. 8 calculates the second term of formula (3).

In this case, if a condition $Tv>>(Kb/M)^{1/2}$ is applied to formula (3), the entire control system illustrated in FIG. 8 has the gain characteristic indicated by the dotted line in FIG. 12. The gain margin of the mechanical resonance frequency $(Kb/M)^{1/2}$ becomes larger. Further, the entire control system has the gain characteristic indicated by the solid line in FIG. 12 in a case where the rigidity of a working part of the feed-axis decreases. Thus, the conventional position control apparatus illustrated in FIG. 8 is effective in solving the problem of low frequency vibrations described in the conventional example illustrated in FIG. 5.

The time constants Tp and Tv of the respective first-order delay circuits 17 and 23 illustrated in FIG. 7 and FIG. 8 can be optimized in the following manner. It is useful to increase the time constants Tp and Tv to increase the gain margin of the mechanical resonance frequency $(Kb/M)^{1/2}$ and stabilize the control system. However, if the gain margin is increased excessively, the control system deteriorates in responsiveness. More specifically, increasing the gain margin constitutes reducing the gain in the control band.

In some cases, the effect of suppressing the load change disturbance or the effect of reducing the position error in a transient response maybe lost. Accordingly, it is desired that the time constants Tp and Tv of respective first-order delay circuits 17 and 23 increase in response to a reduction in the mechanical resonance frequency $(Kb/M)^{1/2}$; more specifically, in accordance with the degree of a reduction in the rigidity of a working part of the feed-axis.

FIG. 9 is a control block diagram illustrating a conventional circuit configuration capable of increasing the time constant Tp of the first-order delay circuit 17 in response to a reduction in the rigidity of a working part of the feed-axis. A subtracter 15 calculates a deflection Ps, which is a difference between the driven member position detection value Pl and the motor position detection value Pm. A deflection detector 16 calculates a time constant coefficient Kt that corresponds to the deflection Ps and then multiplies the time constant coefficient Kt by an initial time constant value Tp0 to generate the time constant Tp to be used by the first-order delay circuit 17.

In the present example, the time constant coefficient Kt is set to increase in proportion to an increase of the deflection Ps. In this case, the time constant Tp to be used in the first-order delay circuit 17 becomes larger when the deflection Ps becomes larger, because the time constant Tp is defined by $Tp=Tp0 \cdot Kt$.

If the relationship between the rigidity of a working part of the feed-axis and the deflection Ps is taken into consideration, the rigidity of a working part of the feed-axis is expressed using the spring having the spring constant Kb that connects the driven member to the motor. If the rigidity decreases; more specifically, if the coupling by the spring is weakened, the deflection Ps (i.e., the difference between the driven member position Pl and the motor position detection value Pm) becomes larger.

More specifically, the deflection detector 16 increases the time constant Tp of the first-order delay circuit 17, considering that the deflection Ps becomes larger when the rigidity of a working part of the feed-axis decreases.

The conventional circuit illustrated in FIG. 9 increases the time constant Tp of the first-order delay circuit 17 and, at the same time, reduces the gain Kp of the speed command calculator 3 in accordance with a reduction in the rigidity of a working part of the feed-axis. The deflection detector 16 calculates the coefficient K that corresponds to the deflection Ps. The deflection detector 16 multiplies the coefficient K by an initial gain value Kp0 to determine the gain Kp to be used in the speed command calculator 3. The coefficient K is set to have a value that decreases when the deflection Ps increases. In this case, the gain Kp becomes smaller when the deflection Ps becomes larger, because the gain Kp is defined by $Kp=Kp0 \cdot K$. More specifically, the deflection detector 16 decreases the gain Kp of the speed command calculator 3 when the rigidity of a working part of the feed-axis reduces.

In the state where the rigidity of a working part of the feed-axis is reduced, the entire control system has the gain characteristic illustrated in FIG. 11. However, when the time constant Tp of the first-order delay circuit 17 is increased in response to a reduction in the rigidity of a working part of the feed-axis, the entire control system illustrated in the block diagram of FIG. 7 has the gain characteristic indicated by the dotted line in FIG. 13. Further, when the gain Kp of the speed command calculator 3 is reduced, the entire control system illustrated in the block diagram illustrated in FIG. 7 has the gain characteristic indicated by the solid line in FIG. 13.

As a result, the gain margin of the mechanical resonance frequency $(Kb/M)^{1/2}$ becomes larger. Thus, the system illustrated in FIG. 9 is effective in solving the problem of low frequency vibrations described in the conventional example illustrated in FIG. 5. At the same time, the system illustrated in FIG. 9 can prevent the gain margin from being secured excessively and prevent the responsiveness of the control system from deteriorating excessively, because the time constant Tp of the first-order delay circuit 17 and the gain Kp of the speed command calculator 3 are appropriately changed in response to a reduction in the rigidity of a working part of the feed-axis.

The conventional circuit configuration illustrated in FIG. 9 secures a sufficient gain margin of the mechanical resonance frequency $(Kb/M)^{1/2}$ and suppresses low frequency vibrations by increasing the time constant Tp of the first-order delay circuit 17 or decreasing the gain Kp of the speed command calculator 3 in accordance with a reduction in the rigidity of a working part of the feed-axis. The reduction in the rigidity of a working part of the feed-axis can be detected based on an increase in the deflection Ps. However, the phenomenon that causes an increase in the deflection Ps is not limited to the above-described case where the rigidity of a working part of the feed-axis decreases or the case where the loading weight of a driven member increases.

A similar phenomenon may occur in response to an increase in the sliding friction acting on a driven member. If the deflection Ps increases in accordance with an increase in the sliding friction acting on a driven member, the gain margin of the mechanical resonance frequency $(Kb/M)^{1/2}$ does not vary substantially. Therefore, it is unnecessary to increase the time constant Tp of the first-order delay circuit 17 or to reduce the gain Kp of the speed command calculator 3. On the other hand, increasing the time constant Tp or reducing the gain Kp of the speed command calculator 3 in this situation secures the gain margin excessively. As a result, the control system may deteriorate in responsiveness. On the contrary, when the deflection Ps decreases in accordance with a reduction of the sliding friction acting on the driven member, low frequency vibrations occur if the time constant Tp of the first-order delay circuit 17 is reduced or the gain Kp of the speed command calculator 3 is increased, although there is no variation in the gain margin of the mechanical resonance frequency $(Kb/M)^{1/2}$.

A practical influence of the sliding friction is described in detail below. The position detection value Pl of a driven member can be expressed using the following formula (4), in which Fd represents the sliding friction acting on the driven member and Pm represents the motor position detection value. In formula (4), S represents a Laplacian operator.

$$Pl(S)=\{Kb/(M\cdot S^2+D\cdot S+Kb)\}\cdot Pm(S)-\{1/(M\cdot S^2+D\cdot S+Kb)\}\cdot Fd(S) \quad \text{formula (4)}$$

If a condition Fd=0 is applied to formula (4); more specifically, when the sliding friction acting on a driven member is ignored, formula (4) becomes equivalent to a spring model 28 of the block diagram illustrated in FIG. 6. More specifically, regardless of the presence of the sliding friction, the mechanical resonance frequency is equal to $(Kb/M)^{1/2}$, which is substantially determined by the rigidity of a working part of the feed-axis and the loading weight of the driven member.

However, the position detection value Pl of a driven member is influenced by the sliding friction acting on the driven member. If driving at an extremely low frequency is presumed; i.e., S=0 in formula (4), formula (4) can be replaced by the following formula (5).

$$Pl(S)=Pm(S)-\{1/Kb\}\cdot Fd(S) \quad \text{formula (5)}$$

More specifically, the magnitude of the deflection Ps (i.e., the difference between the driven member position detection value Pl and the motor position detection value Pm) increases if the rigidity of a working part of the feed-axis decreases; namely, when the spring constant Kb becomes smaller, or when the sliding friction Fd becomes larger.

Further, the magnitude of the sliding friction Fd is variable depending on the speed of the driven member. For example, in a case where a sliding guide mechanism is provided to support and drive the driven member, if the moving speed is high, the driven member can slide on an oil film with less sliding friction. On the other hand, if the moving speed is low, the driven member is subjected to a frictional resistance of the oil film and therefore the sliding friction Fd increases.

Further, the magnitude of the sliding friction Fd is variable due to various factors (e.g., temperature and position of the driven member). Therefore, it is difficult to accurately detect the magnitude of the sliding friction Fd. More specifically, in a driving mechanism including a driven member subjected to a sliding friction that is variable, it is difficult to detect a reduction in the rigidity of a working part of the feed-axis based on the deflection Ps. The time constant Tp of the first-order delay circuit 17 cannot be determined appropriately.

Further, the conventional system illustrated in FIG. 9 secures a sufficient gain margin of the mechanical resonance frequency $(Kb/M)^{1/2}$ and suppresses low frequency vibrations by adequately changing the time constant Tp of the first-order delay circuit 17 and the gain Kp of the speed command calculator 3. However, the control system greatly deteriorates in command responsiveness, although reducing the gain Kp is effective for stabilizing the control system.

Similar to FIG. 6, if it is assumed that the transfer characteristic of a portion ranging from the speed command Vc to the motor speed detection value Vm is equal to 1, the position deviation Pdif and the driven member position detection value Pl in the control system illustrated in FIG. 7 can be expressed by the following formulae (6) and (7) using the position command Pc. In formulae (6) and (7), S represents a Laplacian operator.

$$Pdif(S)=Pc(S)\cdot\{S\cdot(1+Tp\cdot S)\cdot(M\cdot S^2+D\cdot S+Kb)\}/\{S\cdot(1+Tp\cdot S+Kp\cdot Tp)\cdot(M\cdot S^2+D\cdot S+Kb)+Kp\cdot Kb\} \quad \text{formula (6)}$$

$$Pl(S)=Pc(S)\cdot\{(1+Tp\cdot S)\cdot Kp\cdot Kb\}/\{S\cdot(1+Tp\cdot S+Kp\cdot Tp)\cdot(M\cdot S^2+D\cdot S+Kb)+Kp\cdot Kb\} \quad \text{formula (7)}$$

If Tp=0 in formulae (6) and (7), the position deviation Pdif and the driven member position detection value Pl coincide with the transfer characteristic of the control system illustrated in FIG. 6.

To the contrary, if the time constant Tp of the first-order delay circuit 17 is greatly increased (Tp=∞), formulae (6) and (7) can be replaced by the following formulae (8) and (9).

$$Pdif(S)=\{S/(S+Kp)\}\cdot Pc(S) \quad \text{formula (8)}$$

$$Pl(S)=\{Kp/(S+Kp)\}\cdot\{Kb/(M\cdot S^2+D\cdot S+Kb)\}\cdot Pc(S) \quad \text{formula (9)}$$

This is the same as the case where the motor position detection value Pm is equal to the position feedback value Pd. Further, formula(8) indicates that a control response band of the position control system is determined by the gain Kp of the speed command calculator 3. The motor position detection value Pm does not deteriorate in responsiveness even if the time constant Tp of the first-order delay circuit 17 is increased.

Further, formula (9) indicates that the response band of the driven member position detection value Pl is determined by the gain Kp of the speed command calculator 3 unless the rigidity of a working part of the feed-axis in the spring model 28 decreases too drastically to maintain a relationship Kp<$(Kb/M)^{1/2}$. More specifically, although the deterioration in responsiveness of the driven member position detection value Pl is influenced by a reduction in the rigidity of a working part of the feed-axis, the amount of the influence is substantially ignorable because it is a variation suppressed by a first-order delay element of the gain Kp.

On the other hand, if the gain Kp of the speed command calculator 3 is reduced greatly (Kp=0), formula (6) can be replaced by the following formula (10).

$$Pdif(S)=Pc(S) \quad \text{formula (10)}$$

Formula (10) indicates that the position control system does not respond at all. Reducing the gain Kp of the speed command calculator 3 is effective in suppressing low frequency vibrations that may occur when the rigidity of a working part of the feed-axis decreases. However, the motor position detection value Pm will deteriorate in responsiveness. Needless to say, the responsiveness of the driven member position detection value Pl further deteriorates, compared to that of the motor position detection value Pm, by an amount corresponding to the reduction in the rigidity of a working part of the feed-axis.

One of the problems to be solved by the present invention is that it is unable to detect a reduction in the rigidity of a working part of the feed-axis in a driving mechanism in which a driven member is subjected to a torque disturbance, such as sliding friction, because the magnitude of a deflection may change in accordance with a variation in the magnitude of the torque disturbance. Further, it is unable to adjust the time constant of a first-order delay circuit, which is required to calculate a position/speed feedback value, to an appropriate value according to the degree of reduction in the rigidity of a working part of the feed-axis. As a result, if an excessively large gain margin is secured, the control system may deteriorate in responsiveness. On the other hand, if the secured gain margin is smaller, low frequency vibrations may occur in a driven member.

An object of the present invention is to provide a position control apparatus that can detect a reduction in the mechanical resonance frequency that may occur in response to a reduction in the rigidity of a working part of the feed-axis or in response to an increase in loading weight of a driven member and, at least, can optimize the time constant of the first-order delay circuit according to resonance characteristics in such a way as to prevent the driven member from vibrating at low frequencies and minimize the reduction in responsiveness of the control system.

SUMMARY

To solve the above-described problem, an aspect of the present invention provides a driven member position control apparatus that includes a motor position detector and a driven member position detector capable of detecting a driven member driven by a motor and is configured to perform full-closed control for controlling the position of the driven member. The position control apparatus includes a subtracter configured to calculate a deflection that represents a difference between a position detection value obtained by the motor position detector and a position detection value obtained by the driven member position detector; an adder configured to calculate a position feedback value by adding an output of a first-order delay circuit that receives the deflection and the position detection value obtained by the motor position detector; a speed command calculator configured to output a speed command value by proportionally amplifying a deviation between the position feedback value and a position command value input from a host apparatus; a differentiator configured to calculate a speed feedback value by differentiating the position detection value obtained by the motor position detector; a torque command calculator configured to output a torque command value by proportionally and integrally amplifying a deviation between the speed feedback value and the speed command value; a mechanism configured to drive the motor according to the torque command value; and an aging corrector configured to receive the position command value and the position detection value obtained by the driven member position detector and control a time constant of the first-order delay circuit in such a way as to increase the time constant when a vibratory state of the driven member is detected, wherein the position control apparatus suppresses low frequency vibrations occurring when a mechanical resonance frequency decreases due to aging.

Further, another aspect of the present invention provides a driven member position control apparatus that includes a motor position detector and a driven member position detector capable of detecting a driven member driven by a motor and is configured to perform full-closed control for controlling the position of the driven member. The position control apparatus includes a speed command calculator configured to output a speed command value by proportionally amplifying a deviation between a position feedback value, which is a position detection value obtained by the driven member position detector, and a position command value input from a host apparatus; a differentiator configured to calculate a motor speed detection value by differentiating a position detection value obtained by the motor position detector; a differentiator configured to calculate a driven member speed detection value by differentiating the position detection value obtained by the driven member position detector; an adder configured to calculate a speed feedback value by adding the motor speed detection value and an output of a first-order delay circuit that receives a difference between the motor speed detection value and the driven member speed detection value; a torque command calculator configured to output a torque command value by proportionally and integrally amplifying a deviation between the speed feedback value and the speed command value; a mechanism configured to drive the motor according to the torque command value; and an aging corrector configured to receive the position command value and the position detection value obtained by the driven member position detector and control a time constant of the first-order delay circuit in such a way as to increase the time constant when a vibratory state of the driven member is detected, wherein the position control apparatus suppresses low frequency vibrations occurring when a mechanical resonance frequency decreases due to aging.

In a preferred embodiment of the present invention, the aging corrector includes a second-order differentiator configured to output an acceleration command by obtaining a second-order derivative of the position command value; a comparator configured to determine that a driving mechanism is not in an acceleration/deceleration state if the magnitude of the acceleration command is equal to or less than a threshold value and output a vibration detection starting signal; a subtracter configured to calculate a position error of the driven member based on a difference between the position command value and the position detection value obtained by the driven member position detector; a vibration detector configured to calculate and output a vibration frequency of the vibration included in a position error signal of the driven member when the vibration detection starting signal is output; a divider configured to calculate a vibration period based on the vibration frequency to output an initial time constant value; and an adder configured to update and output the time constant of the first-order delay circuit by repetitively adding a time constant increment having been set beforehand and the initial time constant value while the vibration detector detects the vibration, wherein the position control apparatus increases the time constant of the first-order delay circuit when a vibratory state of the driven member is detected.

In a preferred embodiment of the present invention, the aging corrector changes a gain setting value of the speed command calculator in such a way as to reduce the gain setting value if the changed time constant exceeds a predetermined permissible time constant. In this case, it is desired that the aging corrector includes a second-order differentiator configured to output an acceleration command by obtaining a second-order derivative of the position command value; a comparator configured to determine that a driving mechanism is not in an acceleration/deceleration state if the magnitude of the acceleration command is equal to or less than a threshold and output a vibration detection starting signal; a subtracter configured to calculate a position error of the driven member based on a difference between the position command value and the position detection value obtained by the driven member position detector; a vibration detector configured to calculate and output a vibration frequency of the vibration included in a position error signal of the driven member when the vibration detection starting signal is output; a divider configured to calculate a vibration period based on the vibration frequency to output an initial time constant value; an adder configured to update and output the time constant of the first-order delay circuit by repetitively adding a time constant increment having been set beforehand to the initial time constant value while the vibration detector detects the vibration; a calculator configured to calculate a vibratory angular frequency based on the vibration frequency to output an initial gain value; a subtracter configured to calculate a gain recommendation value by repetitively subtracting a gain decrement having been set beforehand from the initial gain value while the vibration detector detects the vibration; and a gain output switcher configured to update and output the gain recommendation value as the gain setting value of the speed command calculator if the time constant of the first-order delay circuit exceeds a predetermined permissible time constant, and configured to continuously hold the output value without changing the gain setting value of the speed command calculator if the time constant of the first-order delay circuit does not exceed the predetermined permissible time constant, wherein the time constant of the first-order delay circuit is increased when a vibratory state of the driven member is detected, and the gain setting value of the speed command calculator is reduced when the changed time constant exceeds the predetermined permissible time constant.

In a preferred embodiment of the present invention, the aging corrector changes a gain setting value of at least one of the torque command calculator and the speed command calculator in such a way as to reduce the gain setting value if the changed time constant exceeds a predetermined permissible time constant. In this case, it is desired that the aging corrector includes a second-order differentiator configured to output an acceleration command by obtaining a second-order derivative of the position command value; a comparator configured to determine that a driving mechanism is not in an acceleration/deceleration state if the magnitude of the acceleration command is equal to or less than a threshold and output a vibration detection starting signal; a subtracter configured to calculate a position error of the driven member based on a difference between the position command value and the position detection value obtained by the driven member position detector; a vibration detector configured to calculate and output a vibration frequency of the vibration included in a position error signal of the driven member when the vibration detection starting signal is output; a divider configured to calculate a vibration period based on the vibration frequency to output an initial time constant value; an adder configured to update and output the time constant of the first-order delay circuit by repetitively adding a time constant increment having been set beforehand to the initial time constant value while the vibration detector detects the vibration; a gain conversion initial value adjuster configured to output a predetermined gain conversion initial value; a subtracter configured to calculate a gain conversion value by repetitively subtracting a gain decrement having been set beforehand from the gain conversion initial value while the vibration detector detects the vibration; and a gain output switcher configured to multiply the gain setting value of at least one of the torque command calculator and the speed command calculator by the gain conversion value if the time constant of the first-order delay circuit exceeds the predetermined permissible time constant, and configured to continuously hold the output value without changing the gain setting value of the at least one of the torque command calculator and the speed command calculator if the time constant of the first-order delay circuit does not exceed the predetermined permissible time constant, wherein the time constant of the first-order delay circuit is increased when a vibratory state of the driven member is detected, and the gain setting value of the at least one of the torque command calculator and the speed command calculator is reduced only when the changed time constant exceeds the predetermined permissible time constant.

When the position control apparatus according to the present invention is employed for a feed-axis driving mechanism in which the magnitude of a torque disturbance (e.g., sliding friction) acting on a driven member is variable, the aging corrector detects a vibratory state occurring due to a reduction in the rigidity of a working part of the feed-axis and increases the time constant Tp of the first-order delay circuit of the position detection value calculation unit, or the time constant Tv of the first-order delay circuit of the speed detection value calculation unit. As a result, the position control apparatus can operate the driven member appropriately while suppressing low-frequency vibrations even when the rigidity of a working part of the feed-axis decreases. Further, the position control apparatus reduces gain setting values of the speed command calculator and the torque command calculator, if necessary. As a result, the position control apparatus can operate the driven member appropriately while suppressing low frequency vibrations even when the rigidity of a working part of the feed-axis decreases, and can minimize the reduction in the responsiveness of the control system.

DETAILED DESCRIPTION

Figure 1:
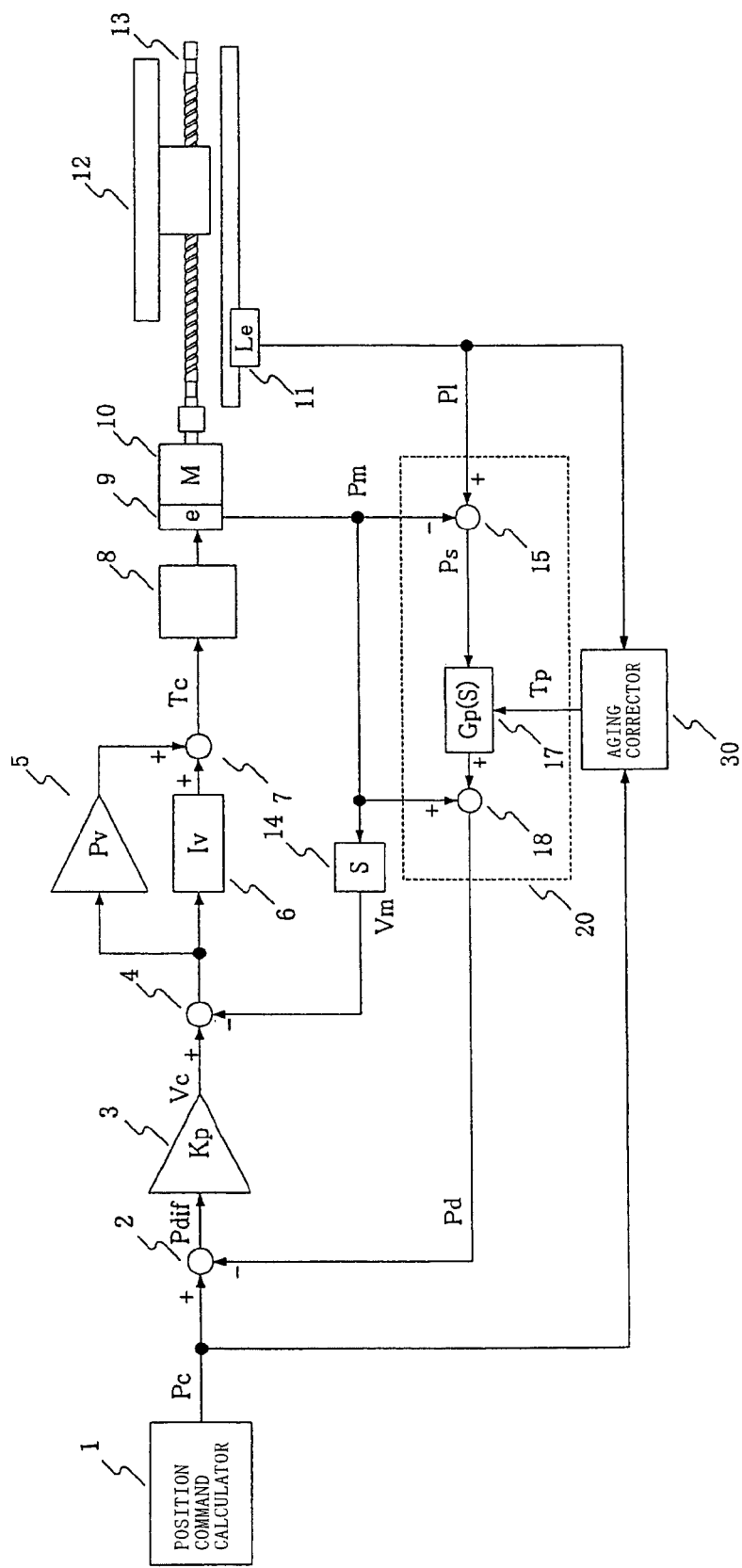
FIG. 1 is a block diagram illustrating a position control apparatus according to an embodiment of the present invention.
Figure 2:
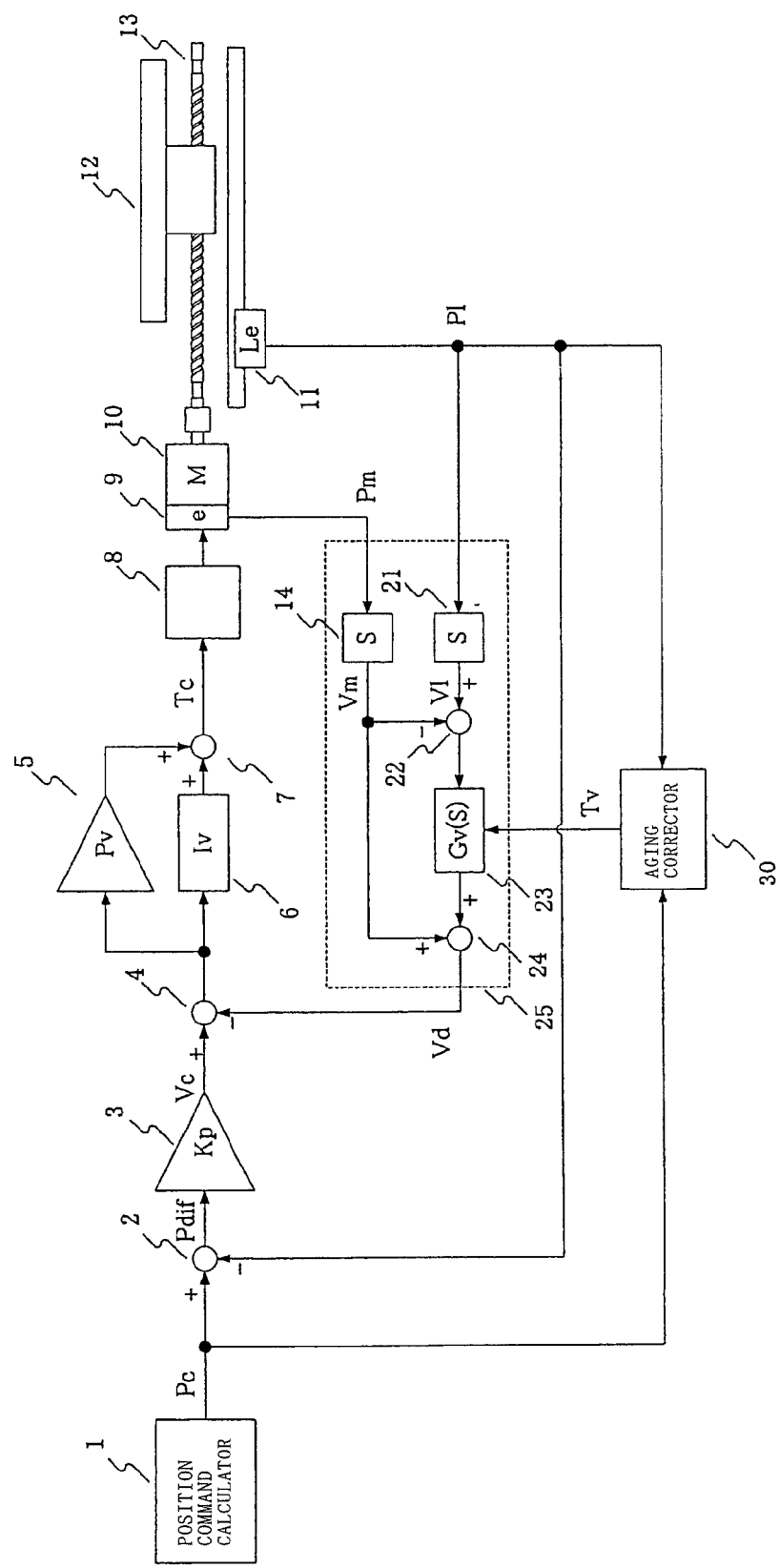
FIG. 2 is a block diagram illustrating a position control apparatus according to an embodiment of the present invention.

An embodiment of the present invention is described below. Components similar to those illustrated in FIGS. 4 to 8 are denoted by the same reference numerals and their descriptions are not repeated. Each of FIG. 1 and FIG. 2 illustrates a control block diagram according to the present invention. An aging corrector 30 receives the position command Pc and the driven member position detection value Pl and detects a vibratory state of a driven member when a driving mechanism is not in an acceleration/deceleration state. Further, if a vibratory state of the driven member is detected, the aging corrector 30 changes the time constants Tp and Tv to be used in the first-order delay circuits 17 and 23.

Figure 3:
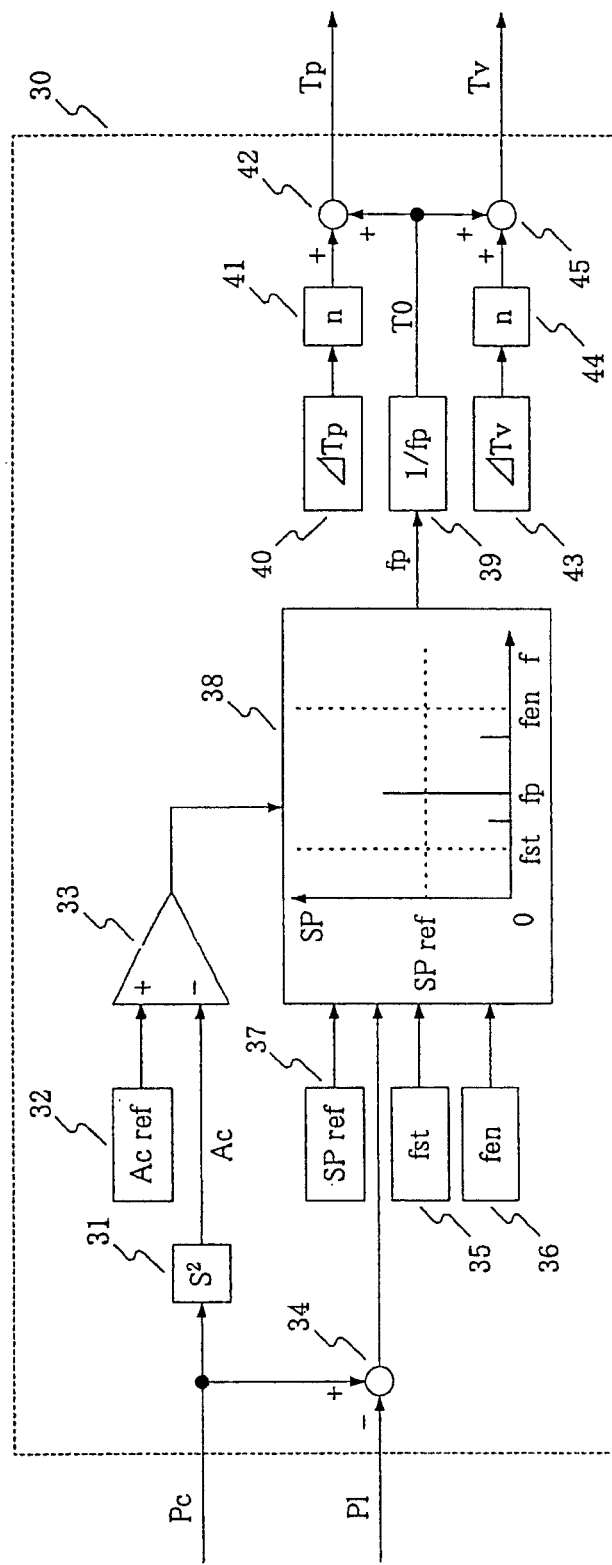
FIG. 3 is a block diagram illustrating an aging corrector of the position control apparatus according to an embodiment of the present invention.

FIG. 3 illustrates an example of the aging corrector 30 that can change the time constants Tp and Tv. The position command value Pc is input to a second-order differentiator 31. The second-order differentiator 31 calculates an acceleration command Ac by obtaining a two-order derivative of the position command value Pc. A comparator 33 compares the calculated acceleration command Ac with an acceleration command threshold value Acref having been set beforehand. If the acceleration command Ac is equal to or less than the acceleration command threshold value Acref, it is determined that the driving mechanism is not in the acceleration/deceleration state (i.e., is in a stationary state). The comparator 33 outputs a vibration detection starting signal to a vibration detector 38.

As another input (i.e., in addition to the vibration detection starting signal), the vibration detector 38 receives a driven member position error signal that represents a difference between the position command value Pc and the driven member position detection value Pl. While the vibration detection starting signal is output from comparator 33, the vibration detector 38 calculates and outputs a vibration frequency fp of the vibration included in the driven member position error signal. In this case, the detection range of the vibration frequency fp is limited to a predetermined range of "fst" to "fen" having been set beforehand.

Further, the vibration detector 38 outputs the vibration frequency fp based on the presence of the vibration that can be recognized only when the magnitude (i.e., amplitude) of the vibration included in the driven member position error signal is greater than a predetermined setting value SPref. A divider 39 calculates a vibration period as the reciprocal of the received vibration frequency fp. The divider 39 outputs an initial time constant value T0 based on the calculated vibration period.

The calculated initial time constant value T0 is set as initial values of the time constants Tp and Tv to be used in the first-order delay circuits 17 and 23. If the vibration frequency fp is continuously detected by the vibration detector 38 even after the values of the time constants Tp and Tv have been updated, each of counters 41 and 44 starts a count-up operation. The counters 41 and 44 add time constant increments ΔTp and ΔTv having been set beforehand to increase the values of the time constants Tp and Tv. Namely, the time constant Tp becomes larger by the amount of the time constant increment ΔTp. The time constant Tv becomes larger by the amount of the time constant increment ΔTv.

Each of the counters 41 and 44 continuously performs the above-described count-up operation unless the vibration detector 38 stops outputting the vibration frequency fp. Therefore, the values of the time constants Tp and Tv increase stepwise until the vibration detector 38 detects no vibration. In other words, the values of the time constants Tp and Tv increase by the amount just required to prevent the driven member from vibrating. Thus, it is unnecessary to set an excessively large time constant.

In the present embodiment, the initial time constant value T0 output from the divider 39 is updated if the vibration frequency fp of the vibration detector 38 has a different value. The updated value can be held while the vibration detector 38 detects no vibration.

Similarly, the counter value n in respective counters 41 and 44 is cleared when the vibration detector 38 detects the vibration frequency fp having a different value. If the vibration detector 38 detects no vibration, the count value is held. The counters 41 and 44 perform the count-up operation continuously if the value of the vibration frequency fp remains the same, as described previously.

Further, as is well known in the technical field, Discrete Fourier Transform (DFT) or Fast Fourier Transform (FFT) is usable to realize a vibration detection algorithm for the vibration detector 38 that calculates the vibration frequency fp of the vibration included in the driven member position error signal while the vibration detection starting signal is output as described above.

Alternatively, the vibration period can be detected directly by measuring a time interval between two points at which the driven member position error signal takes a maximum value or a minimum value. In this case, the initial time constant value T0 can be directly determined though conversion among units. Therefore, the divider 39 is not required to perform processing for converting the vibration frequency fp into the initial time constant value T0.

Further, in the above-described embodiment, the aging corrector 30 changes the time constants Tp and Tv to be used in the first-order delay circuit. However, transfer characteristics Gp(S) and Gv(S) of respective control blocks 17 and 23 illustrated in FIG. 1 and FIG. 2 are not limited to first-order delay characteristics.

More specifically, any filter having high-frequency cutoff characteristics is usable. For example, a Finite Impulse Response (FIR) Filter capable of calculating a moving average is usable. In this case, it is useful to constitute a moving average of Tp/Ts stage and a moving average of Tv/Ts stage for a sampling period Ts of the control system to enhance vibration suppression effects.

Figure 11:
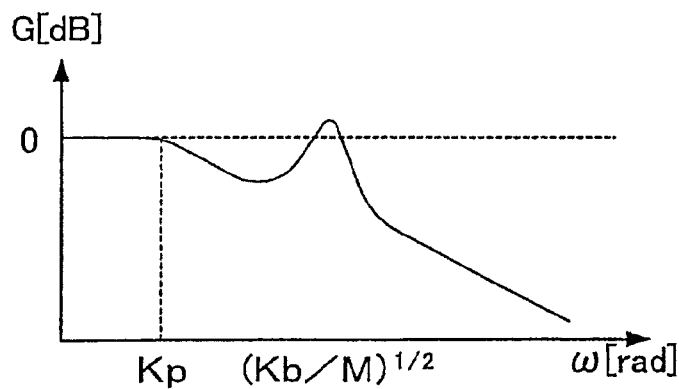
FIG. 11 is a graph illustrating a gain characteristic deteriorated due to reduction in the mechanical resonance frequency.
Figure 12:
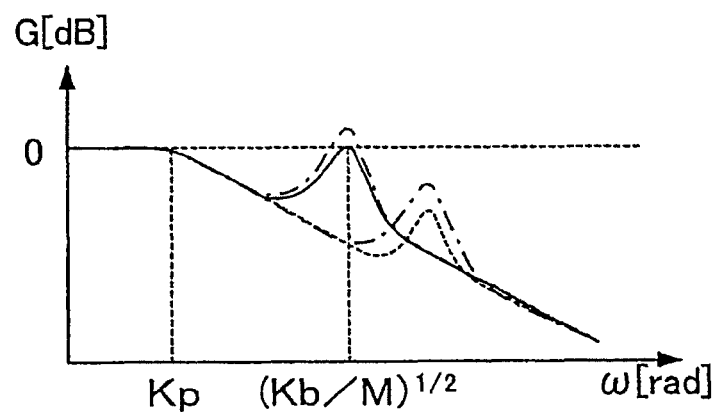
FIG. 12 is a graph illustrating gain characteristics obtainable when the time constant of the first-order delay circuit is increased.
Figure 13:
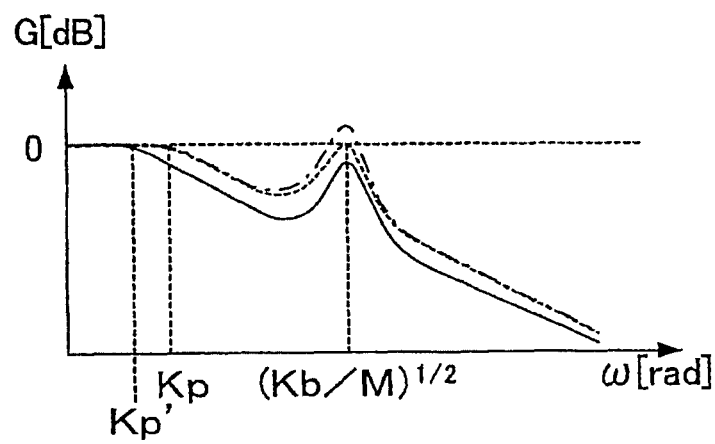
FIG. 13 is a graph illustrating gain characteristics obtainable when the time constant of the first-order delay circuit is increased and the gain of a speed command calculator is decreased.

As described above, if low frequency vibrations occur when the mechanical resonance frequency $(Kb/M)^{1/2}$ decreases as illustrated in FIG. 11, the position control apparatus according to the present invention increases the time constants Tp and Tv until no vibration is observed. Thus, the gain margin of the mechanical resonance frequency $(Kb/M)^{1/2}$ can be enlarged and the gain characteristics indicated by the solid line in FIG. 12 can be obtained.

As a result, the position control apparatus according to the present invention can stabilize operations of the control system and can suppress low frequency vibrations. Further, the time constants Tp and Tv can be prevented from being set to excessively large values. Therefore, the control system does not deteriorate in responsiveness, because of unnecessity of securing an excessively large gain margin. Further, the aging corrector 30 changes the time constants Tp and Tv when a vibratory state of a driven member is detected. Therefore, if the present invention is employed for a feed-axis driving mechanism in which the magnitude of a torque disturbance (e.g., sliding friction) acting on a driven member is variable, it is feasible to appropriately detect a reduction in the rigidity of a working part and suppress low frequency vibrations.

Figure 4A:
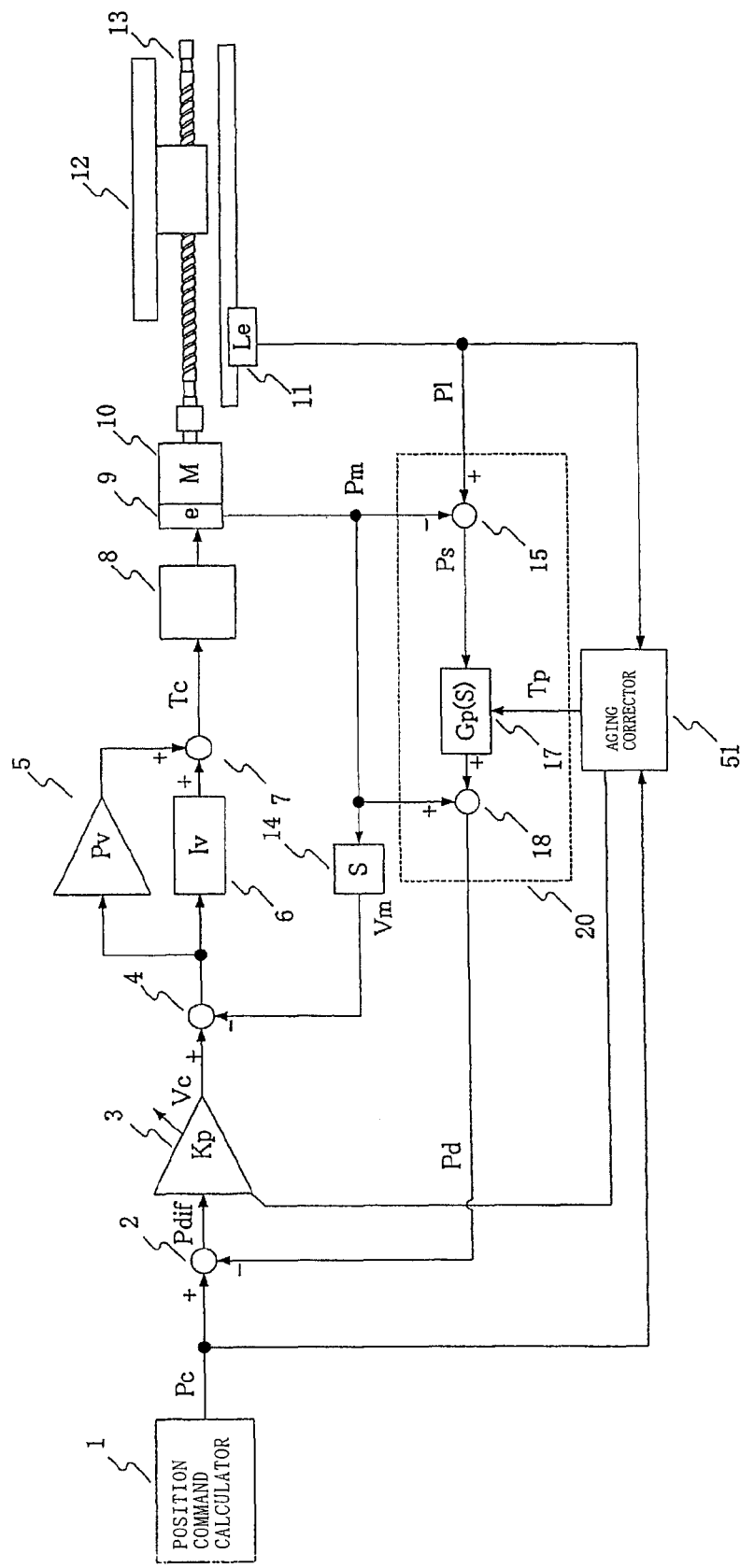
FIG. 4A is a block diagram illustrating a position control apparatus according to another embodiment of the present invention.

Next, another embodiment is described below with reference to FIG. 4A and FIG. 43. FIG. 4A is a control block diagram illustrating a position control apparatus. The position control apparatus illustrated in FIG. 4A is different from the apparatus illustrated in FIG. 1 in that the aging corrector 30 is replaced by an aging corrector 51 having a different configuration. The position control apparatus illustrated in FIG. 4A can change the gain Kp of the speed command calculator 3 in addition to the time constant Tp to be used in the first-order delay circuit 17. Further, FIG. 4B illustrates a configuration of the aging corrector 51 provided in the position control apparatus illustrated in FIG. 4A.

Figure 4B:
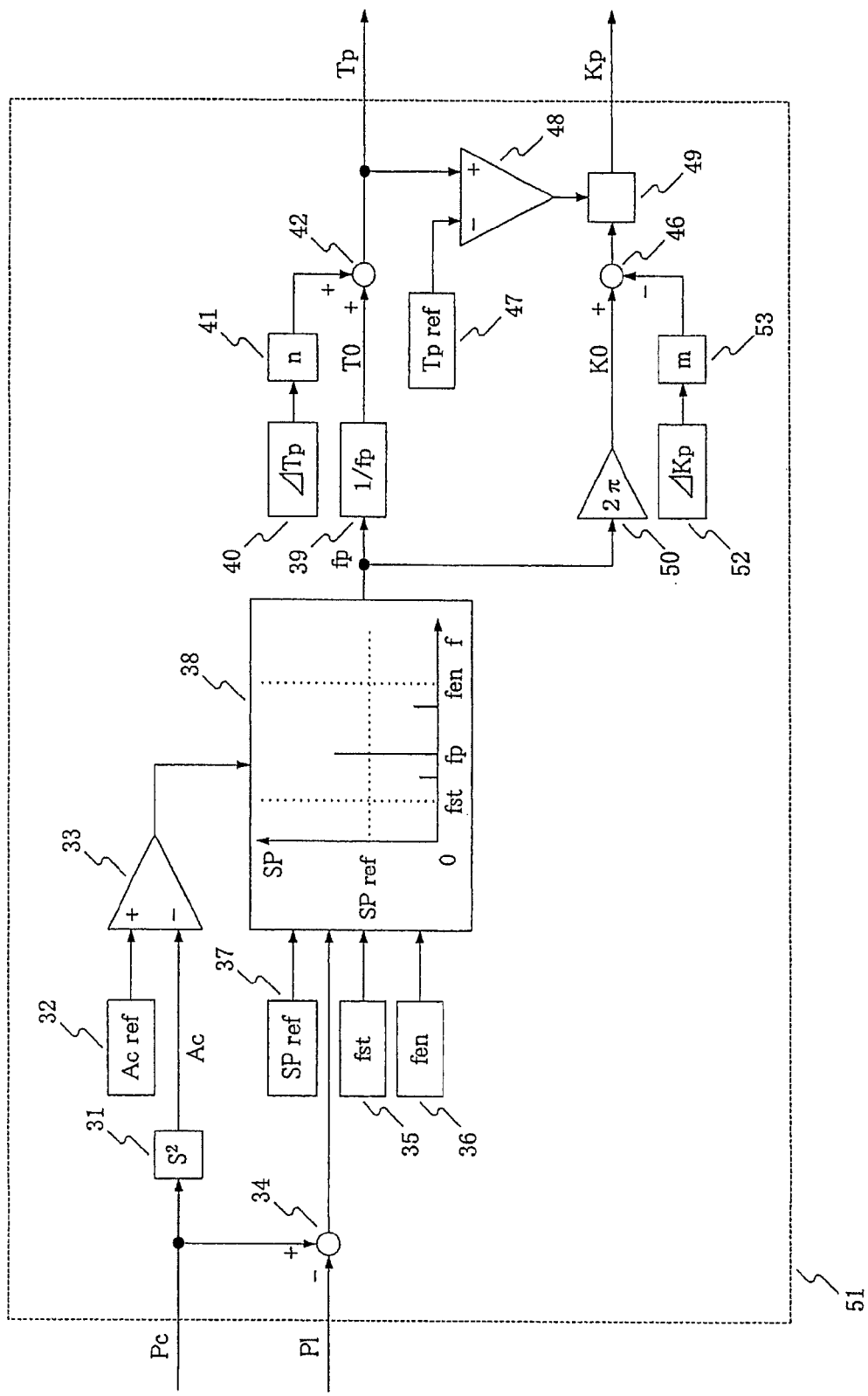
FIG. 4B is a block diagram illustrating an aging corrector according to another embodiment of the present invention.

The aging corrector 51 illustrated in FIG. 4B receives the position command Pc and the driven member position detection value Pl and detects a vibratory state of a driven member when a driving mechanism is not in an acceleration/deceleration state. Further, if a vibratory state of the driven member is detected, the aging corrector 51 changes the gain Kp of the speed command calculator in addition to the time constant Tp to be used in the first-order delay circuit 17.

More specifically, the aging corrector 51 illustrated in FIG. 4A changes the time constant Tp according to a processing flow described with reference to FIG. 3. Further, the aging corrector 51 changes the gain Kp of the speed command calculator according to the following procedure.

When the vibration detector 38 outputs the vibration frequency fp, an angular frequency calculator 50 converts the vibration frequency fp into a vibratory angular frequency and outputs an initial gain value KO. A comparator 48 compares the time constant Tp with a permissible time constant Tpref having been set beforehand. As a result of the comparison, if the time constant Tp exceeds the permissible time constant Tpref, again output switcher 49 sets the calculated initial gain value K0 as an initial value of the gain Kp to be used in the speed command calculator 3.

If the vibration frequency fp is continuously detected by the vibration detector 38 even after the value of the gain Kp has been updated, a counter 53 starts a count-up operation. The counter 53 subtracts a gain decrement ΔKp having been set beforehand from the gain Kp. Namely, the gain Kp becomes smaller by the amount of the gain decrement ΔKp. The above-described count-up operation does not stop if the vibration frequency fp is continuously detected by the vibration detector 38. Therefore, the value of the gain Kp decreases until no vibration is detected by the vibration detector 38. In other words, the reduction amount of the gain Kp is substantially equivalent to an amount just required to prevent the driven member from vibrating. Thus, it becomes feasible to prevent the gain from being set as an excessively smaller value. Further, it is feasible to minimize the reduction in responsiveness of the position control system, because the gain Kp is reduced only when increasing the time constant Tp is ineffective in suppressing the vibrations.

As is apparent from the foregoing description, the position control apparatus according to the present embodiment can obtain functions and effects similar to those of the position control apparatus described with reference to FIG. 1 and FIG. 3. More specifically, if low frequency vibrations occur when the mechanical resonance frequency $(Kb/M)^{1/2}$ decreases, the position control apparatus according to the present embodiment increases the time constant Tp until no vibration is observed. Thus, the gain margin of the mechanical resonance frequency $(Kb/M)^{1/2}$ becomes larger. Therefore, it is feasible to stabilize the control system and suppress generation of low frequency vibrations.

Further, in a case where the mechanical resonance frequency is reduced too greatly to suppress vibrations even if the time constant Tp is increased, the position control apparatus according to the present embodiment reduces the gain Kp to suppress the vibrations. Therefore, it is feasible to suppress the vibrations in a wide frequency band as compared with a case where only the time constant Tp is adjusted to suppress the vibrations.

Further, the position control apparatus according to the present embodiment prevents the time constant Tp from being set to an excessively large value and prevents the gain Kp from being set to an excessively smaller value. In addition, the position control apparatus according to the present embodiment prioritizes suppressing the vibrations based on the adjustment of the time constant Tp. Therefore, it is feasible to prevent the gain margin from being secured excessively and to minimize the reduction in responsiveness of the control system.

Further, the aging corrector 51 changes the time constant Tp and the gain Kp when a vibratory state of a driven member is detected. Therefore, even in the feed-axis driving mechanism in which the magnitude of a torque disturbance (e.g., sliding friction) acting on a driven member is variable, it is feasible to appropriately detect a reduction in the rigidity of a working part and suppress low frequency vibrations.

Figure 4C:
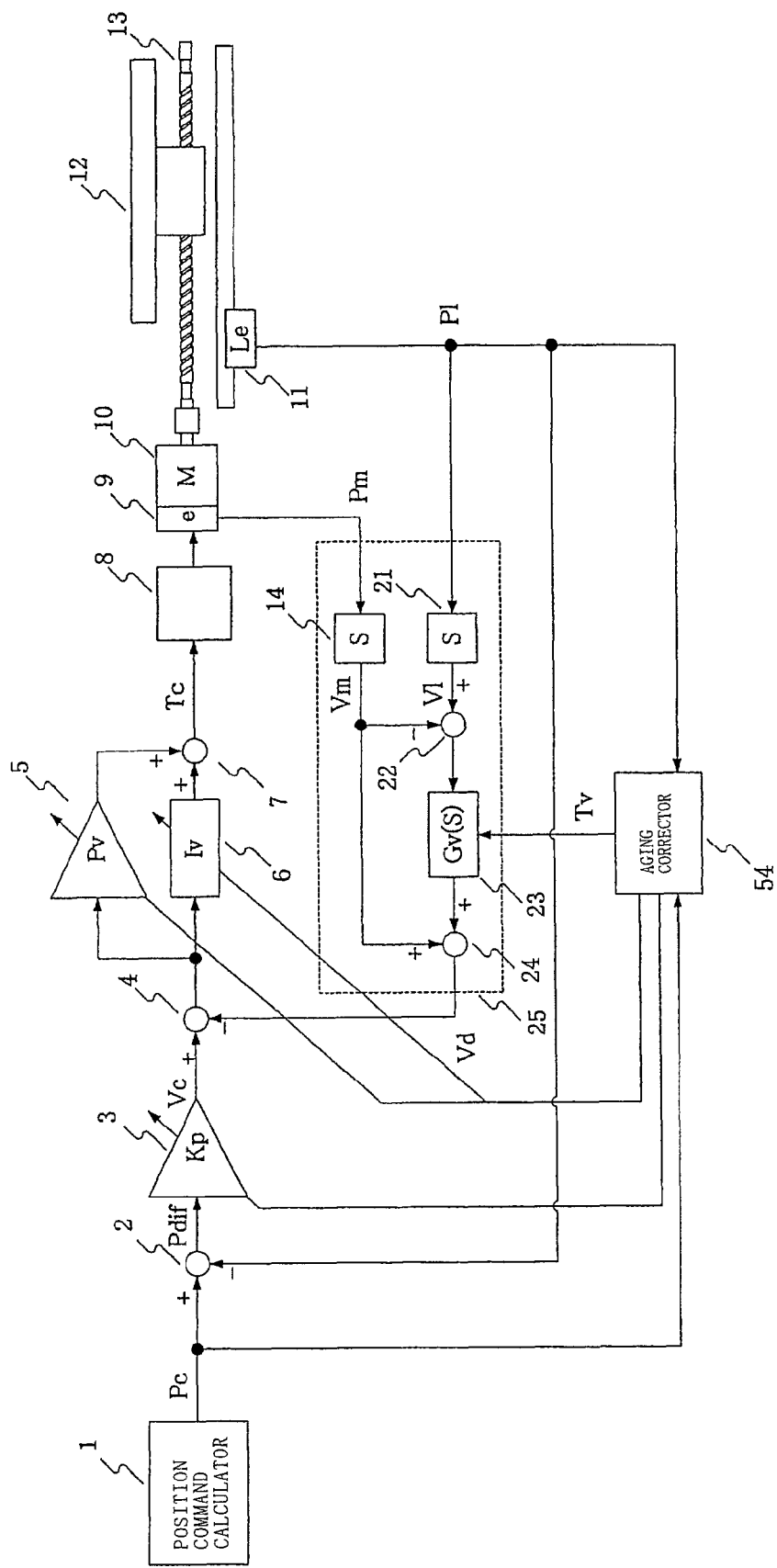
FIG. 4C is a block diagram illustrating a position control apparatus according to another embodiment of the present invention.

Next, another embodiment is described below with reference to FIG. 4C and FIG. 4D. FIG. 4C is a block diagram illustrating a position control apparatus. The position control apparatus illustrated in FIG. 4C is different from the position control apparatus illustrated in FIG. 2 in that the aging corrector 30 is replaced by an aging corrector 54 having a different configuration. Further, the position control apparatus illustrated in FIG. 4C can change the gain Kp of the speed command calculator 3 and both the proportional gain Pv and the integral gain Iv of the torque command calculator, in addition to the time constant Tv to be used in the first-order delay circuit 23. Further, FIG. 4D illustrates a configuration of the aging corrector 54 provided in the position control apparatus illustrated in FIG. 4C.

Figure 4D:
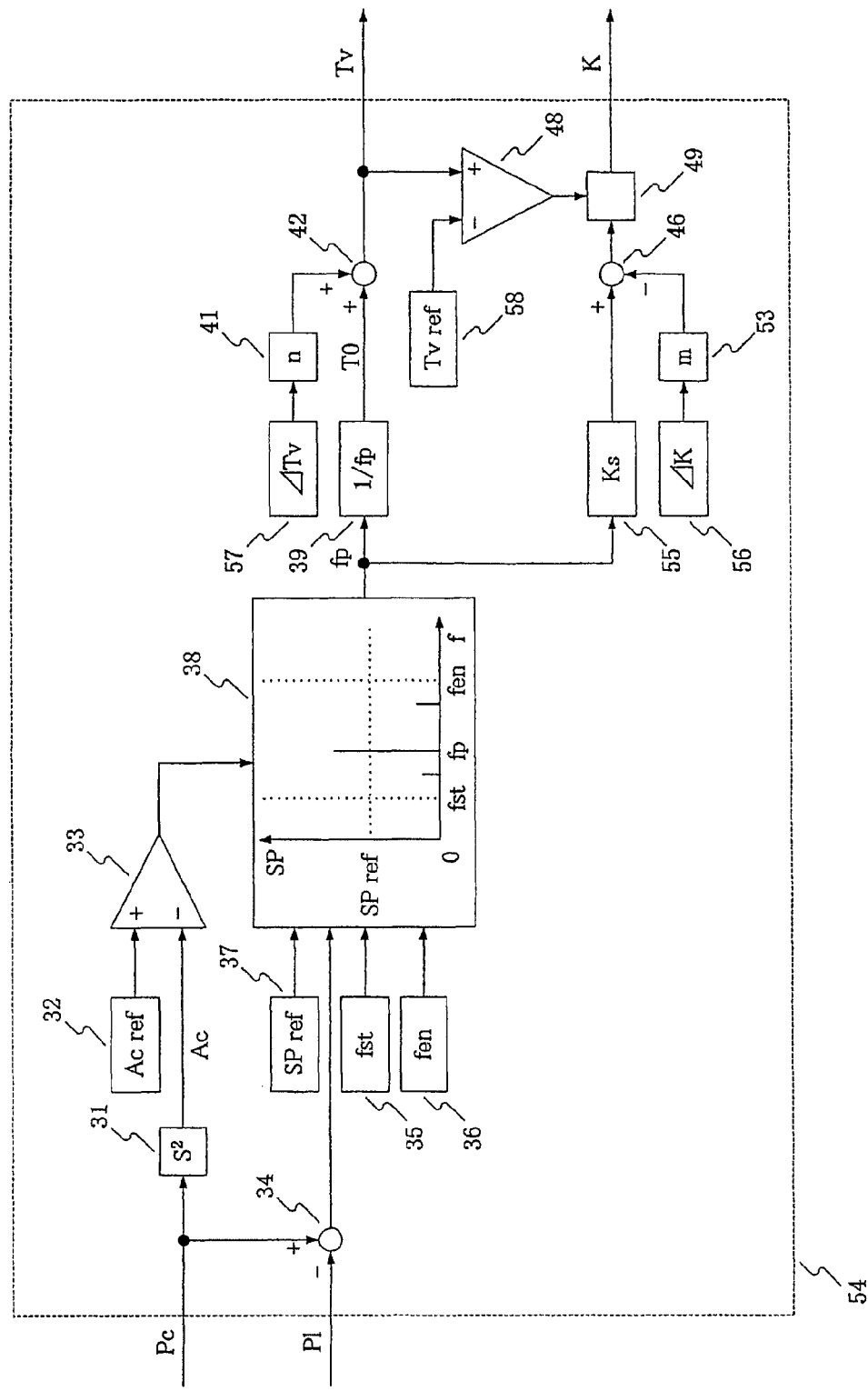
FIG. 4D is a block diagram illustrating an aging corrector according to another embodiment of the present invention.
Figure 5:
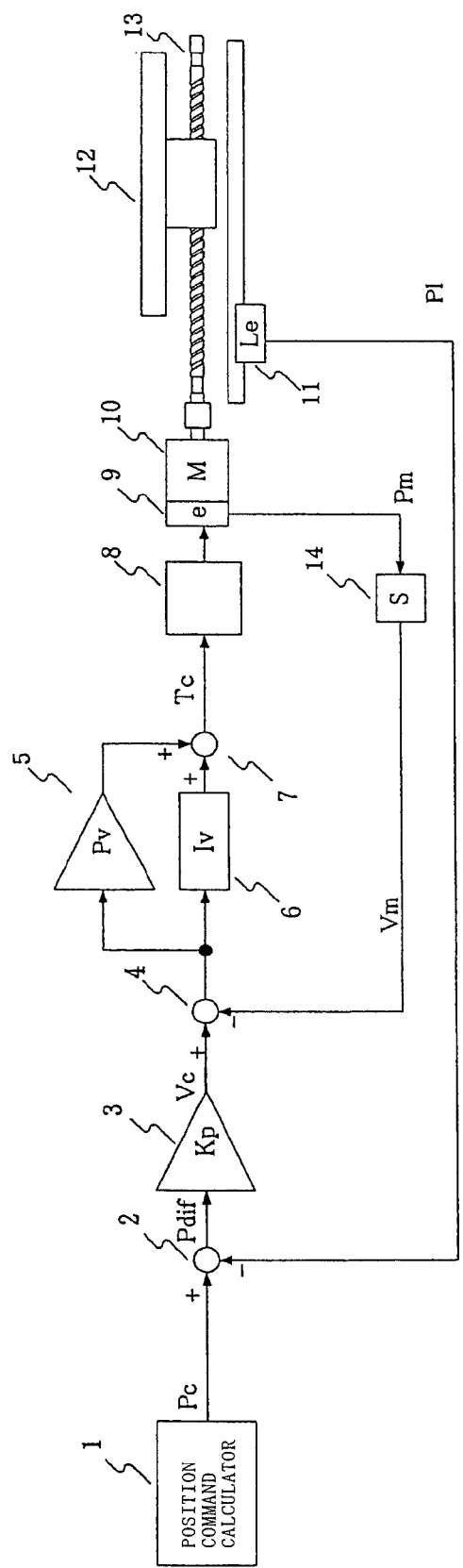
FIG. 5 is a block diagram illustrating a conventional position control apparatus.
Figure 6:
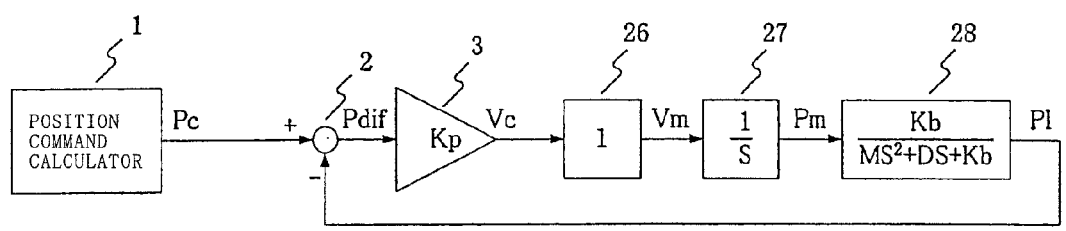
FIG. 6 is a block diagram illustrating a conventional position control apparatus.
Figure 7:
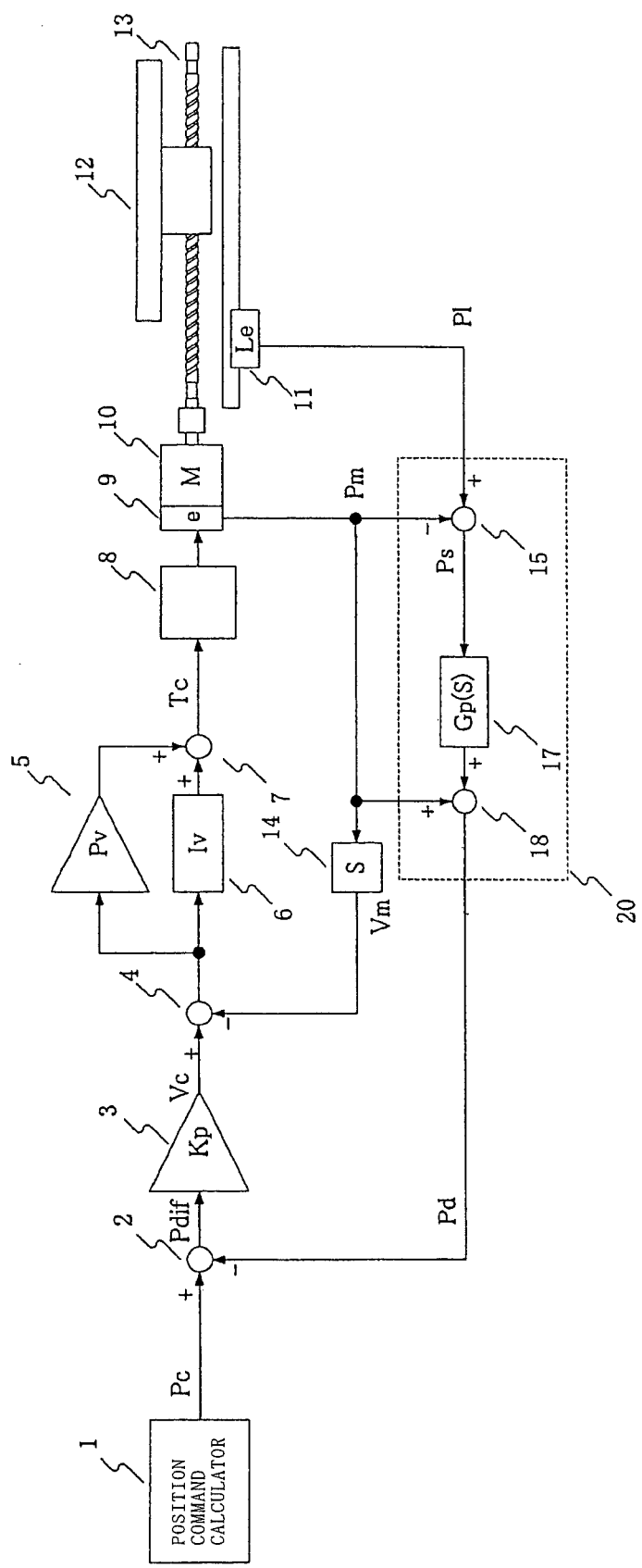
FIG. 7 is a block diagram illustrating a conventional position control apparatus.
Figure 8:
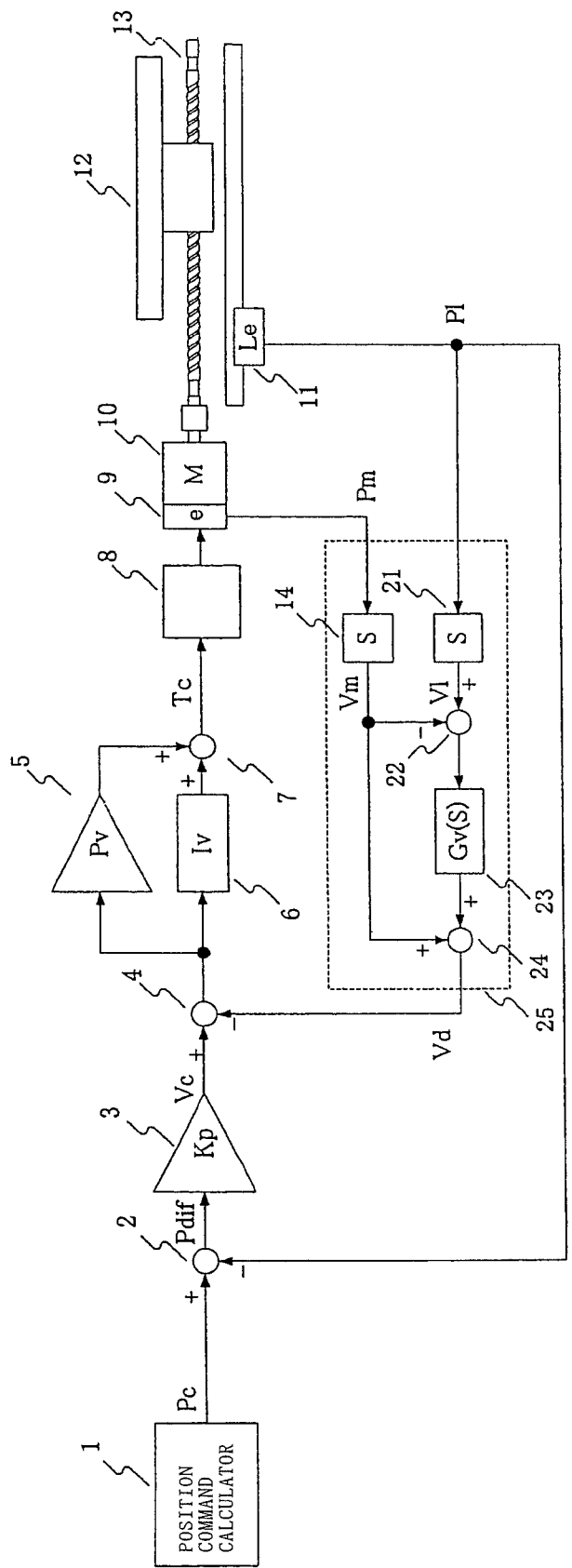
FIG. 8 is a block diagram illustrating a conventional position control apparatus.
Figure 9:
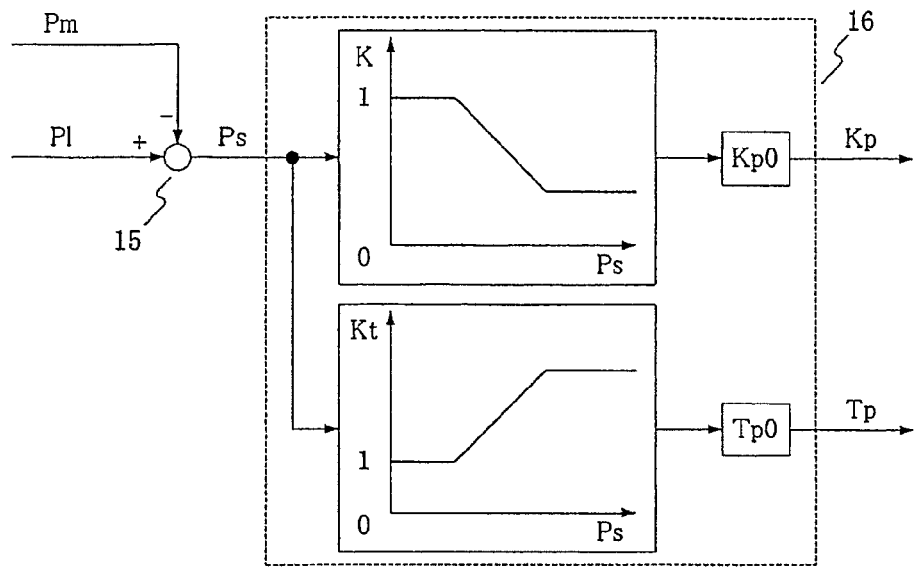
FIG. 9 is a block diagram illustrating a conventional time constant control circuit.
Figure 10:
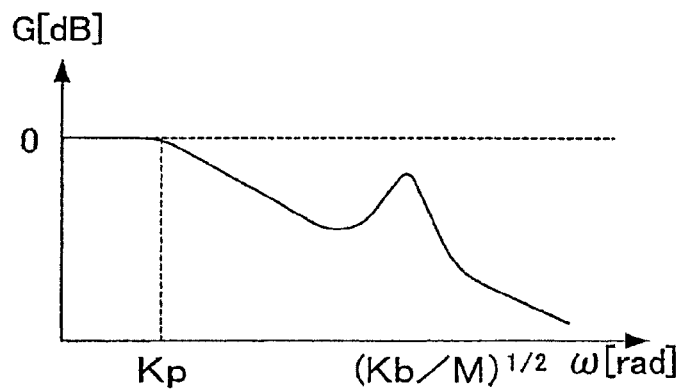
FIG. 10 is a graph illustrating a gain characteristic in a state where the mechanical resonance frequency is not reduced.

The aging corrector 54 illustrated in FIG. 4D receives the position command Pc and the driven member position detection value Pl and detects a vibratory state of a driven member when a driving mechanism is not in an acceleration/deceleration state. Further, if a vibratory state of the driven member is detected, the aging corrector 54 changes the gain Kp of the speed command calculator and both the proportional gain Pv and the integral gain Iv of the torque command calculator in addition to the time constant Tv to be used in the first-order delay circuit 23.

More specifically, the aging corrector 54 illustrated in FIG. 4D changes the time constant Tv according to the processing flow described with reference to FIG. 3. Further, the aging corrector 54 changes the gain Kp of the speed command calculator and both the proportional gain Pv and the integral gain Iv of the torque command calculator according to the following procedure. When the vibration detector 38 outputs the vibration frequency fp, a gain conversion initial value adjuster 55 outputs a gain conversion initial value Ks. In the present embodiment, the initial value Ks is set to a value slightly smaller than 1 (100%). The comparator 48 compares the time constant Tv with a permissible time constant Tvref having been set beforehand. As a result of the comparison, if the time constant Tv exceeds the permissible time constant Tvref, the gain output switcher 49 outputs the gain conversion initial value Ks as a gain conversion value K.

The aging corrector 54 multiplies the proportional gain Pv and the integral gain Iv of the torque command calculator by the gain conversion value K to update each value and reduce the gain setting values of the torque command calculator. If the vibration frequency fp is continuously detected by the vibration detector 38 even after the gain setting values have been updated, the counter 53 performs a count-up operation. The counter 53 subtracts the gain decrement ΔK having been set beforehand from the gain conversion value K. Thus, the value of the gain conversion value K becomes smaller by the amount of the gain decrement ΔK.

The above-described count-up operation does not stop if the vibration frequency fp is continuously detected by the vibration detector 38. Therefore, the value of the gain conversion value K decreases until no vibration is detected by the vibration detector 38. The values of the proportional gain Pv and the integral gain Iv of the torque command calculator become smaller by the same rate.

In other words, the reduction amount of the gain setting value is substantially equivalent to an amount just required to prevent the driven member from vibrating. Thus, it becomes feasible to prevent the gain from being set as an excessively smaller value. Further, it is feasible to minimize the reduction in responsiveness of the speed control system, because the gain setting value is reduced only when increasing the time constant Tv is ineffective in suppressing the vibrations.

If the gain setting value of the torque command calculator is reduced, the control response band of the speed feedback system reduces. Therefore, if the gain Kp of the speed command calculator 3 is continuously held as a high setting value, the position control system becomes unstable and may generate a vibratory response. In such a case, to solve the problem, it is desired to reduce the proportional gain Pv and the integral gain Iv of the torque command calculator according to the gain conversion value K and, at the same time, reduce the gain Kp of the speed command calculator 3.

As apparent from the foregoing description, the position control apparatus according to the present embodiment can obtain functions and effects similar to those of the position control apparatus described with reference to FIG. 2 and FIG. 3. More specifically, if low frequency vibrations occur when the mechanical resonance frequency $(Kb/M)^{1/2}$ decreases, the position control apparatus according to the present embodiment increases the time constant Tv until no vibration is observed. Thus, the gain margin of the mechanical resonance frequency $(Kb/M)^{1/2}$ becomes larger. Therefore, it is feasible to stabilize the control system and suppress generation of low frequency vibrations.

Further, in a case where the mechanical resonance frequency is reduced too greatly to suppress vibrations even if the time constant Tv is increased, the position control apparatus according to the present embodiment reduces the gain setting values of the torque command calculator and the speed command calculator to suppress the vibrations. Therefore, it is feasible to suppress the vibrations in a wide frequency band as compared with a case where only the time constant Tv is adjusted to suppress the vibrations.

Further, the position control apparatus according to the present embodiment prevents the time constant Tv from being set as an excessively large value and prevents the gain setting value from being set as an excessively smaller value. In addition, the position control apparatus according to the present embodiment prioritizes suppressing the vibrations based on the adjustment of the time constant Tv. Therefore, it is feasible to prevent the gain margin from being secured excessively and to minimize the reduction in responsiveness of the control system.

Further, the aging corrector 54 changes the time constant Tv and the gains of the torque command calculator and the speed command calculator when a vibratory state of a driven member is detected. Therefore, even in the feed-axis driving mechanism in which the magnitude of a torque disturbance (e.g., sliding friction) acting on a driven member is variable, it is feasible to appropriately detect a reduction in the rigidity of a working part and suppress low frequency vibrations.

What is claimed is:

1. A driven member position control apparatus that includes a motor position detector and a driven member position detector capable of detecting a driven member driven by a motor and is configured to perform full-closed control for controlling the position of the driven member, the position control apparatus comprising:

a subtracter configured to calculate a deflection that represents a difference between a position detection value obtained by the motor position detector and a position detection value obtained by the driven member position detector;

an adder configured to calculate a position feedback value by adding an output of a first-order delay circuit that receives the deflection and the position detection value obtained by the motor position detector;

a speed command calculator configured to output a speed command value by proportionally amplifying a deviation between the position feedback value and a position command value input from a host apparatus;

a differentiator configured to calculate a speed feedback value by differentiating the position detection value obtained by the motor position detector;

a torque command calculator configured to output a torque command value by proportionally and integrally amplifying a deviation between the speed feedback value and the speed command value;

a mechanism configured to drive the motor according to the torque command value; and an aging corrector configured to receive the position command value and the position detection value obtained by the driven member position detector and control a time constant of the first-order delay circuit in such a way as to increase the time constant when a vibratory state of the driven member is detected, wherein the position control apparatus suppresses low frequency vibrations occurring when a mechanical resonance frequency decreases due to aging.

2. The position control apparatus according to claim 1, wherein the aging corrector comprises:

a second-order differentiator configured to output an acceleration command by obtaining a second-order derivative of the position command value;

a comparator configured to determine that a driving mechanism is not in an acceleration/deceleration state if the magnitude of the acceleration command is equal to or less than a threshold value and to output a vibration detection starting signal;

a subtracter configured to calculate a position error of the driven member based on a difference between the position command value and the position detection value obtained by the driven member position detector;

a vibration detector configured to calculate and output a vibration frequency of the vibration included in a position error signal of the driven member when the vibration detection starting signal is output;

a divider configured to calculate a vibration period based on the vibration frequency to output an initial time constant value; and an adder configured to update and output the time constant of the first-order delay circuit by repetitively adding a time constant increment having been set beforehand and the initial time constant value while the vibration detector detects the vibration, wherein the position control apparatus increases the time constant of the first-order delay circuit when a vibratory state of the driven member is detected.

3. The position control apparatus according to claim 1, where the aging corrector changes a gain setting value of the speed command calculator in such a way as to reduce the gain setting value if the changed time constant exceeds a predetermined permissible time constant.

4. The position control apparatus according to claim 3, wherein the aging corrector comprises:
a second-order differentiator configured to output an acceleration command by obtaining a second-order derivative of the position command value;
a comparator configured to determine that a driving mechanism is not in an acceleration/deceleration state if the magnitude of the acceleration command is equal to or less than a threshold and to output a vibration detection starting signal;
a subtracter configured to calculate a position error of the driven member based on a difference between the position command value and the position detection value obtained by the driven member position detector;
a vibration detector configured to calculate and output a vibration frequency of the vibration included in a position error signal of the driven member when the vibration detection starting signal is output;
a divider configured to calculate a vibration period based on the vibration frequency to output an initial time constant value;
an adder configured to update and output the time constant of the first-order delay circuit by repetitively adding a time constant increment having been set beforehand to the initial time constant value while the vibration detector detects the vibration;
a calculator configured to calculate a vibratory angular frequency based on the vibration frequency to output an initial gain value;
a subtracter configured to calculate a gain recommendation value by repetitively subtracting a gain decrement having been set beforehand from the initial gain value while the vibration detector detects the vibration; and
a gain output switcher configured to update and output the gain recommendation value as the gain setting value of the speed command calculator if the time constant of the first-order delay circuit exceeds a predetermined permissible time constant, and configured to continuously hold the output value without changing the gain setting value of the speed command calculator if the time constant of the first-order delay circuit does not exceed the predetermined permissible time constant,
wherein the time constant of the first-order delay circuit is increased when a vibratory state of the driven member is detected, and the gain setting value of the speed command calculator is reduced when the changed time constant exceeds the predetermined permissible time constant.

5. A driven member position control apparatus that includes a motor position detector and a driven member position detector capable of detecting a driven member driven by a motor and is configured to perform full-closed control for controlling the position of the driven member, the position control apparatus comprising:
a speed command calculator configured to output a speed command value by proportionally amplifying a deviation between a position feedback value, which is a position detection value obtained by the driven member position detector, and a position command value input from a host apparatus;
a differentiator configured to calculate a motor speed detection value by differentiating a position detection value obtained by the motor position detector;
a differentiator configured to calculate a driven member speed detection value by differentiating the position detection value obtained by the driven member position
an adder configured to calculate a speed feedback value by adding the motor speed detection value and an output of a first-order delay circuit that receives a difference between the motor speed detection value and the driven member speed detection value;
a torque command calculator configured to output a torque command value by proportionally and integrally amplifying a deviation between the speed feedback value and the speed command value;
a mechanism configured to drive the motor according to the torque command value; and
an aging corrector configured to receive the position command value and the position detection value obtained by the driven member position detector and control a time constant of the first-order delay circuit in such a way as to increase the time constant when a vibratory state of the driven member is detected,
wherein the position control apparatus suppresses low frequency vibrations occurring when a mechanical resonance frequency decreases due to aging.

6. The position control apparatus according to claim 5, wherein the aging corrector changes a gain setting value of at least one of the torque command calculator and the speed command calculator in such a way as to reduce the gain setting value if the changed time constant exceeds a predetermined permissible time constant.

7. The position control apparatus according to claim 6, wherein the aging corrector comprises:
a second-order differentiator configured to output an acceleration command by obtaining a second-order derivative of the position command value;
a comparator configured to determine that a driving mechanism is not in an acceleration/deceleration state if the magnitude of the acceleration command is equal to or less than a threshold and to output a vibration detection starting signal;
a subtracter configured to calculate a position error of the driven member based on a difference between the position command value and the position detection value obtained by the driven member position detector;
a vibration detector configured to calculate and output a vibration frequency of the vibration included in a position error signal of the driven member when the vibration detection starting signal is output;
a divider configured to calculate a vibration period based on the vibration frequency to output an initial time constant value;
an adder configured to update and output the time constant of the first-order delay circuit by repetitively adding a time constant increment having been set beforehand to the initial time constant value while the vibration detector detects the vibration;
a gain conversion initial value adjuster configured to output a predetermined gain conversion initial value;
a subtracter configured to calculate a gain conversion value by repetitively subtracting a gain decrement having been set beforehand from the gain conversion initial value while the vibration detector detects the vibration; and
a gain output switcher configured to multiply the gain setting value of at least one of the torque command calculator and the speed command calculator by the gain conversion value if the time constant of the first-order delay circuit exceeds the predetermined permissible time constant, and configured to continuously hold the output value without changing the gain setting value of the at least one of the torque command calculator and the speed command calculator if the time constant of the first-order delay circuit does not exceed the predetermined permissible time constant, wherein the time constant of the first-order delay circuit is increased when a vibratory state of the driven member is detected, and the gain setting value of the at least one of the torque command calculator and the speed command calculator is reduced only when the changed time constant exceeds the predetermined permissible time constant.

* * * * *